United States Patent
Watanabe et al.

(10) Patent No.: US 6,487,215 B1
(45) Date of Patent: Nov. 26, 2002

(54) ATM COMMUNICATIONS SYSTEM AND ATM TESTING METHOD

(75) Inventors: Kazuhiro Watanabe, Tokyo (JP); Satoshi Owada, Tokyo (JP)

(73) Assignee: Oki Electric Industry Co., Ltd. (JP)

( * ) Notice: Subject to any disclaimer, the term of this patent is extended or adjusted under 35 U.S.C. 154(b) by 0 days.

(21) Appl. No.: 09/265,999

(22) Filed: Mar. 11, 1999

(30) Foreign Application Priority Data

Apr. 17, 1998 (JP) ............................................ 10-107979

(51) Int. Cl.[7] .................................................. H04J 3/16
(52) U.S. Cl. ................. 370/466; 370/241.1; 370/395.6; 714/751
(58) Field of Search .............................. 370/241, 241.1, 370/242, 395.6, 395.61, 395.65, 465–477, 236, 236.1, 236.2, 252, 395.1

(56) References Cited

U.S. PATENT DOCUMENTS

| | | | | |
|---|---|---|---|---|
| 5,457,700 A | * | 10/1995 | Merchant ..................... | 714/744 |
| 5,946,309 A | * | 8/1999 | Westberg et al. ......... | 370/395.3 |
| 6,034,954 A | * | 3/2000 | Takase et al. ................ | 370/362 |
| 6,038,231 A | * | 3/2000 | Dolby et al. ................. | 370/394 |
| 6,061,820 A | * | 5/2000 | Nakakita et al. ............. | 714/751 |
| 6,108,336 A | * | 8/2000 | Duault et al. ................ | 370/395 |
| 6,118,763 A | * | 9/2000 | Trumbull ..................... | 370/231 |
| 6,282,196 B1 | * | 8/2001 | Lyons et al. ................. | 370/394 |

OTHER PUBLICATIONS

"Error Control Protocols on AALS5:FEC–SSCS" Kumiko Kanai et al., B–520, 1995 Communication Society Conference of IEICE.

"Software Implementation of Error Control Protocols on AAL5 (FEC/SSCS)" Kumiko Kanai et al., B–7–16, 1997 Communication Society Conference of IEICE.

"Error Control Protocols on AAL5 and Evaluation: FEC–SSCS" Kumiko Kanai et al., SSE95–54, IN95–74, Sep. 1995, Technical Report of IEICE.

* cited by examiner

*Primary Examiner*—Ricky Ngo
*Assistant Examiner*—Tri H. Phan
(74) *Attorney, Agent, or Firm*—Venable; James R. Burdett

(57) ABSTRACT

An ATM signal generator generates packet signals by linking N data blocks that includes user data and a specifier byte containing a sequence number bit. A transmitter receives the packet signals, generates control signals containing length information, generates N−1 ATM cells accommodating one data block in the payload, generates one ATM cell accommodating one data block and a control signal in the payload, and transmits all of the ATM cells to a communications path. A receiver receives ATM cells from the communications path, detects the number of cell rejections using the sequence number bits extracted from the specifier bytes in all of the ATM cells, and detects the number of bit error occurrences using the length information extracted from the control signals. Sequence number bits are accommodated in all of the ATM cells, and length information is accommodated in the N'th ATM cell, wherefore bit errors and cell rejections can be detected from end to end and the number of cell rejections can be detected even when data containing control signals have been lost on the communications path.

9 Claims, 4 Drawing Sheets

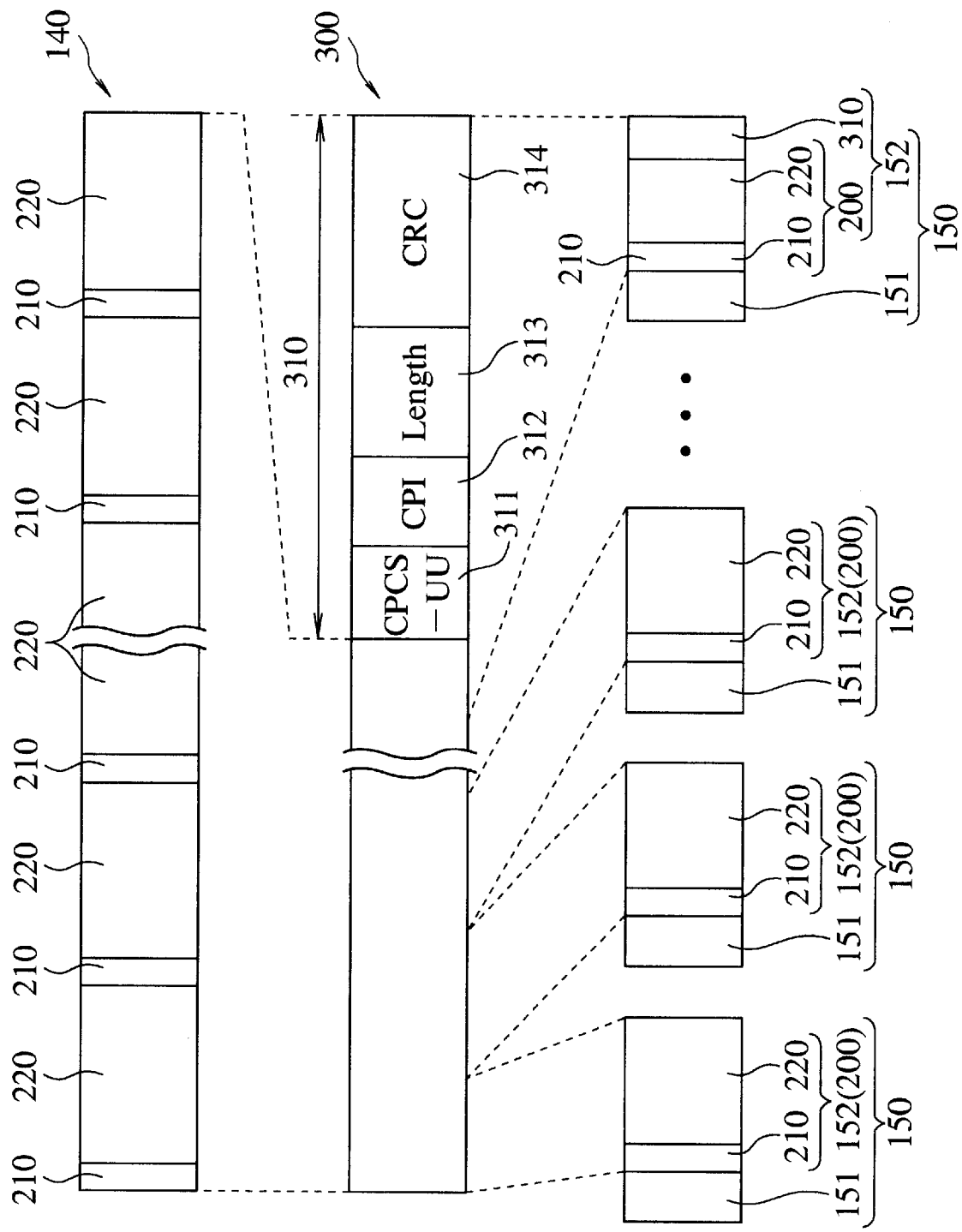

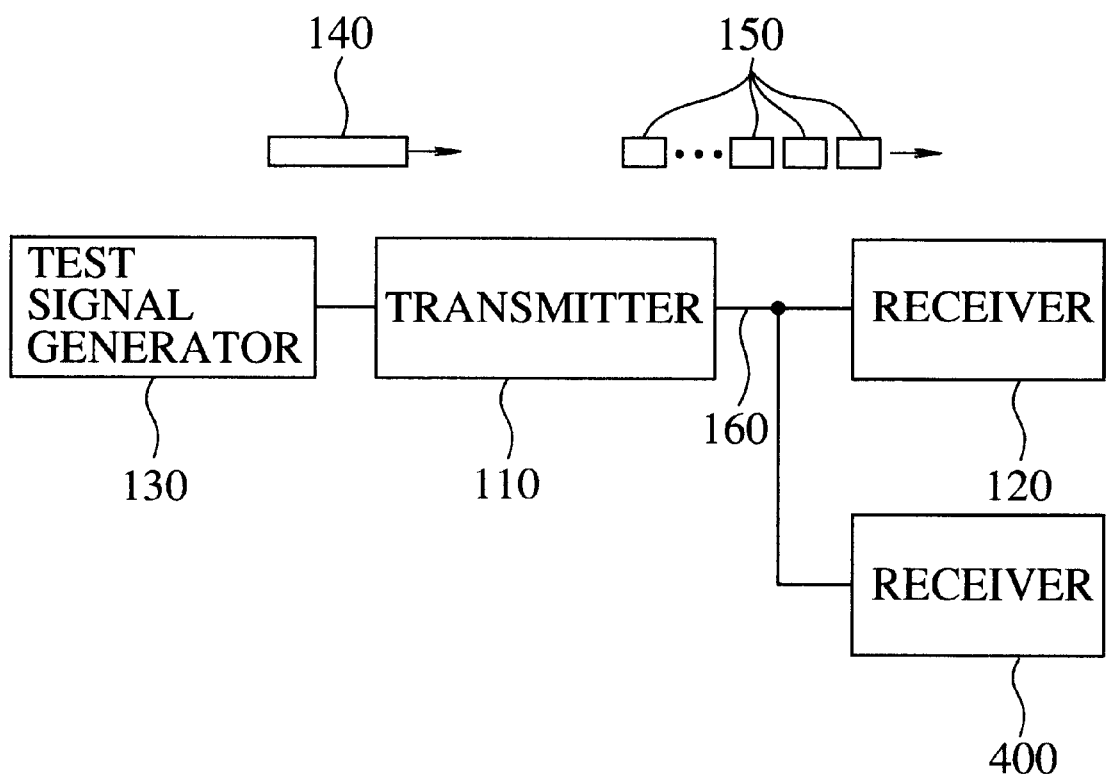

ATM COMMUNICATIONS SYSTEM AND ATM TESTING METHOD

BACKGROUND OF THE INVENTION

1. Field of the Invention

This invention relates to ATM (asynchronous transfer mode) testing technology. ATM testing is performed for the purpose of verifying the reliability of data transferred in ATM communications systems.

2. Description of Related Art

ATM testing is testing that is performed to detect whether or not data have been properly transmitted through a communications path. In such testing, the presence or absence of bit errors in the data and the presence or absence of cell rejection are detected. Cell rejection refers to the rejection of cell signals of low importance in order to protect data of high importance during network convergence. Cell rejection is adopted for the VBR (variable bit rate) services in B-ISDN (broadband aspects of Integrated Service Digital Network). The importance of cell signals is determined by the user.

ITU-T Recommendation I.363 defines AAL (ATM adaptation layer) protocols types 1 to 5 in the B-ISDN reference model. In communications in which the AAL type 5 protocol is adopted, the entire 48-byte information field in the ATM cell is used as payload.

In communications wherein the AAL type 5 protocol is adopted, two general ATM testing schemes are used, as described below.

The first of these testing schemes is specified in ITU-T Recommendation I.610. This scheme employs OAM (operation and maintenance) cells. In ITU-T Recommendation I.610, an OAM cell is referred to as a performance management cell. The OAM cell is an ATM cell that is different from the cells used to send user data, and hence is configured so that it can be distinguished from user cells. The transmitter stores sequence numbers and cyclic code in the OAM cells. The OAM cells are sent by the transmitter over the communications path with a fixed period. The receiver receives the OAM cells from the path, and inspects the sequence numbers and cyclic code in the OAM cells. Based on this inspection, the receiver detects the bit error occurrence rate and cell rejection rate.

The second testing scheme is a scheme that, using the ATM cells, sends control signals together with the user data. The control signals contain lengths (coding that indicates the packet length) and cyclic code. With this scheme, the AAL of the receiver, upon reception of a packet signal from a higher layer, adds a control signal to that packet signal. Next, by line-coding the packet signal and control signal, the AAL generates an ATM cell. This ATM cell is sent via a lower layer to the communications path. At the receiver end, the ATM cell received from the path is sent to an AAL via the lower layer. This AAL, after line-decoding the received ATM cell, extracts the control signal. The receiver, upon detecting a length anomaly, judges that this anomaly has been caused by a cell rejection. The receiver uses the cyclic code to detect the number of bit error occurrences.

These testing schemes, however, have the following shortcomings.

The first scheme detects only bit errors and cell rejections that occur between the transmitter and receiver. It cannot detect cell rejections and bit errors that occur prior to transmission from the transmitter, being unable, for example, to detect cell rejections and bit errors that arise prior to line coding. Hence this scheme suffers the shortcoming of being unable to detect cell rejections and bit errors from end to end.

The second scheme suffers the shortcoming of being unable to detect the number of cell rejections when ATM cells containing control signals are lost in the communications path.

SUMMARY OF THE INVENTION

An object of the present invention is to provide ATM testing technology wherewith bit errors and cell rejections can be detected from end to end, and wherewith the number of cell rejections can be detected even in cases where data containing control signals are lost in the communications path.

To attain this object, the ATM communications system according to the present invention comprises: a signal generator for generating packet signals by linking N data blocks that include user data and a specifier byte containing sequence number bits; a transmitter that receives the packet signals, generates control signals containing length information, generates N−1 ATM cells wherein one data block is accommodated in the payload, generates one ATM cell wherein one data block and one control signal are accommodated in the payload, and transmits all of the ATM cells over the communications path; and a receiver that receives the ATM cells from the communications path, detects the number of cell rejections using sequence number bits extracted from the specifier bytes in all of the ATM cells, and detects the number of bit error occurrences using length information extracted from the control signals.

In such a system as this, sequence number bits are accommodated in all of the ATM cells. Also, length information is accommodated in the N'th ATM cell. Accordingly, the bit errors and cell rejections can be detected from end to end, and the number of cell rejections can be detected even in cases where data containing control signals have been lost on the communications path.

The ATM testing method according to the present invention comprises: a generation step for generating packet signals by linking N data blocks that include user data and a specifier byte containing sequence number bits; a transmission step for generating control signals containing length information, generating N−1 ATM cells wherein one data block is accommodated in the payload, generating one ATM cell wherein one data block and one control signal are accommodated in the payload, and transmitting all of the ATM cells to the communications path; and a detection step for detecting the number of cell rejections using sequence number bits extracted from specifier bytes in ATM cells received from the communications path, and detecting the number of bit error occurrences using length information extracted from the control signals.

In such a system as this, sequence number bits are accommodated in all of the ATM cells and length information is accommodated in the N'th ATM cell. Accordingly, bit errors and cell rejections can be detected from end to end, and the number of cell rejections can be detected even in cases where data containing control signals have been lost on the communications path.

BRIEF DESCRIPTION OF THE DRAWINGS

Other objects and advantages of the present invention are described with reference to the following attached drawings.

FIG. 3 is a simplified diagram for describing line decoding in the system diagrammed in FIG. 1; and FIG. 4 is a simplified block diagram of a communications system in a second embodiment.

DESCRIPTION OF THE PREFERRED EMBODIMENTS

Figure 1:
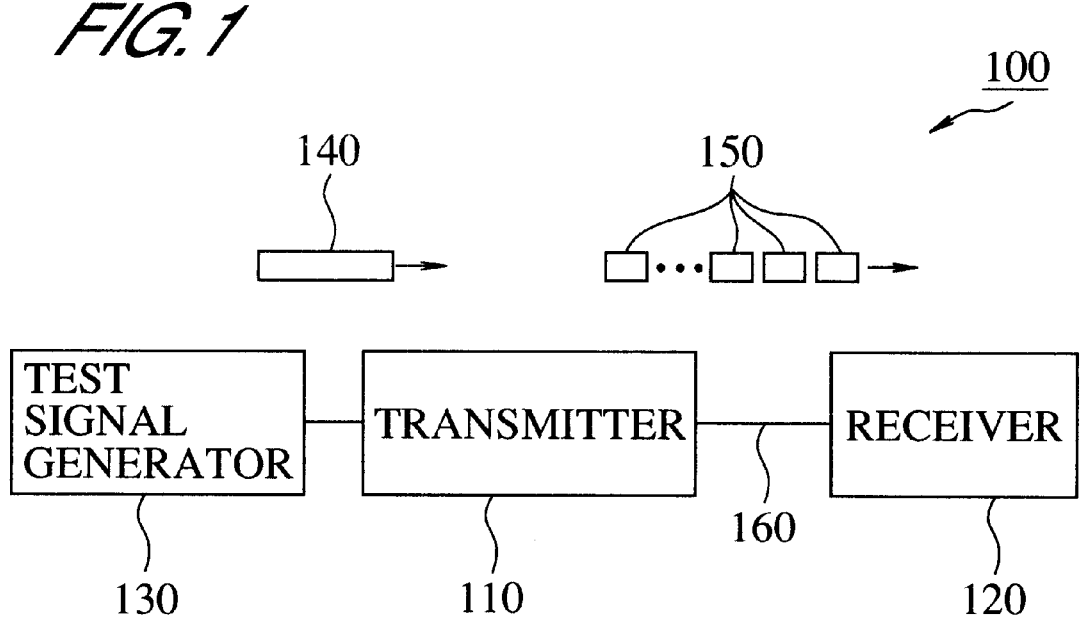
FIG. 1 is a simplified block diagram of a communications system in a first embodiment.

Embodiments of the present invention are now described with reference to the drawings. In the drawings, the sizes, shapes, and positional relationships of the configurational components are merely indicated, in a simplified manner, to the extent necessary for comprehending the invention, and it should also be understood that the numerical conditions described below are given merely as examples.

First Embodiment

A first embodiment of the present invention is described with reference to FIGS. 1 to 3.

As diagrammed in FIG. 1, a communications system 100 pertaining to this embodiment comprises a transmitter 110, a receiver 120, and an ATM test signal generator 130.

The transmitter 110 generates 8-byte control signals, for example, adds these control signals to a packet signal 140 input from the generator 130, line-codes a data group made up of the packet signal 140 and the control signals, and thereby generates an ATM cell 150. This line coding is executed according to the AAL type 5 protocol. These ATM cells are sent to a path 160. The transmitter 110 can use the same control signals as are used in conventional testing schemes. Specifically, these control signals contain lengths and cyclic code.

The receiver 120 receives the ATM cells 140 from the path 160. This receiver 120 comprises functions for line-decoding the ATM cells 150 and functions for detecting the number of rejections of these ATM cells 150. The receiver 120 used is an apparatus that line-decodes the ATM cells 140 according to the AAL type 1 protocol. This AAL type 1 protocol is one of AAL protocol types in the B-ISDN protocol reference model. This protocol is specified in ITU-T Recommendation I.363.

The ATM test signal generator 130 receives user data from the outside, in packet format, for example, and generates packet signals 140 using those data.

The operation of the communications system 100 diagrammed in FIG. 1 is now described in detail. First, the generator 130 receives user data from the outside, in packet format, for example. These data are separated by the generator 130 into N−1 47-byte data groups and one 39-byte data group. The generator 130 adds a 1-byte specifier byte to the head of each data group and thereby generates N−1 48-byte data blocks and one 40-byte data block. Next, the generator 130 links the data blocks together again to create the packet signal 140.

Figures 2A, 2B:
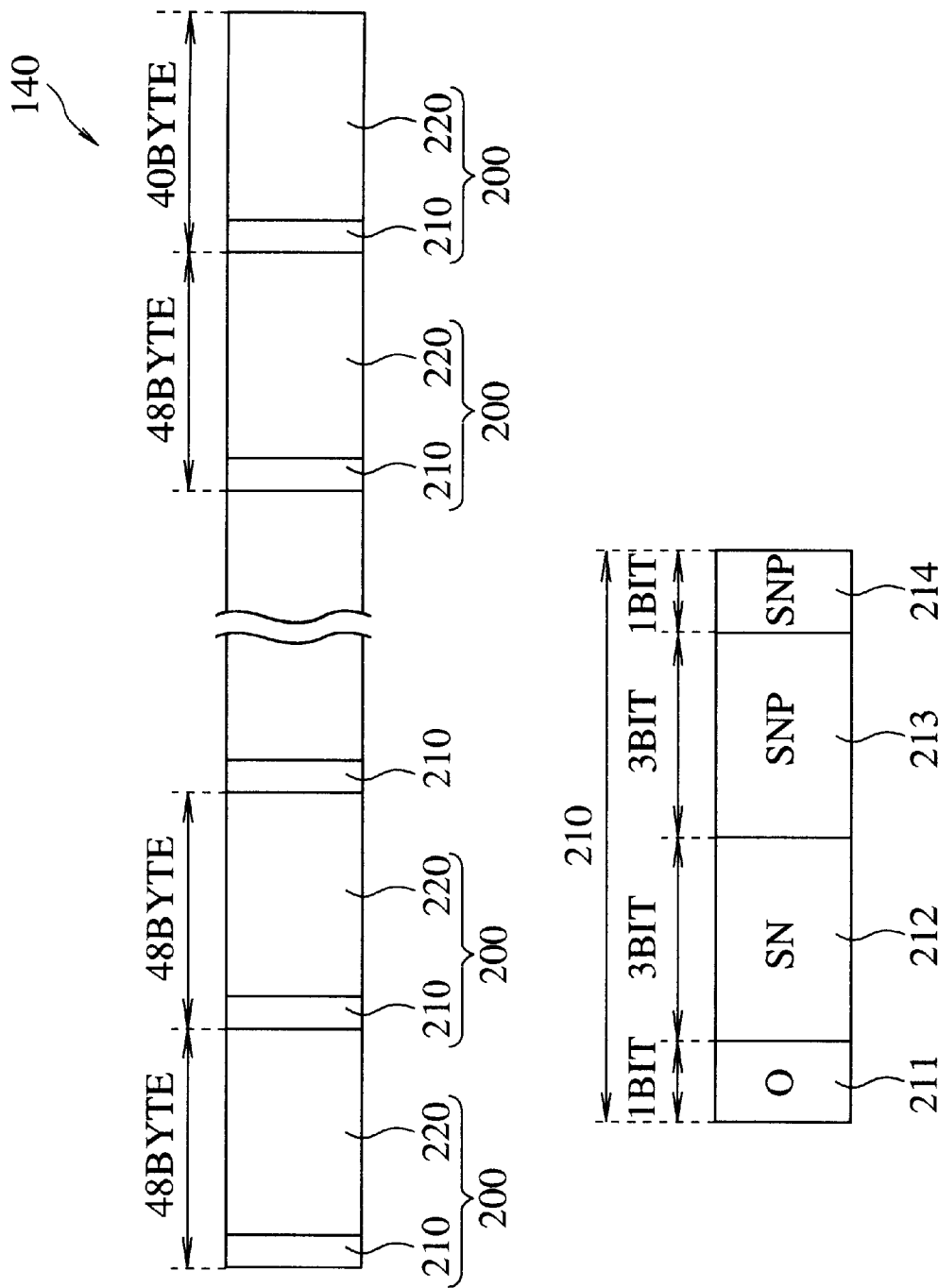
FIG. 2 is a simplified diagram of a packet signal used in the system diagrammed in FIG. 1.

As diagrammed in FIG. 2(A), the packet signal 140 has N data blocks 200. Of these, the first N−1 data blocks 200 each have a 1-byte specifier byte 210 and 47 bytes of discretionary data 220. The final data block 200 comprises a 1-byte specifier byte 210 and 39 bytes of discretionary data 220.

The specifier byte 210 is the same as the SAR-PDU header in the AAL type 1 protocol. As diagrammed in FIG. 2(B), the specifier byte 210 has a fixed bit 211, SN (sequence number) bits 212, SNP (sequence number protection) bits 213, and an SNP bit 214.

The fixed bit 211 consists of 1 bit. The logical value of this fixed bit 211 is always "0."

The SN bits 212 consist of 3 bits. These SN bits 212 express a modulo 8 sequence number. This modulo 8 sequence number is configured of the eight sequence numbers from 0 to 7. Beginning at 0, a value of 1 is added until 7 is reached, whereupon, with the next addition, 0 is returned to. In other words, in modulo 8, the numbers 0 to 7 repeat cyclically.

The SNP bits 213 consist of 3 bits. The SNP bits 213 protect the SN bits with CRC (cyclic redundancy check), following the AAL type 1 specification. In this CRC, the generator polynomial $X^3+X+1$ is used as the cyclic code polynomial.

The SNP bit 214 consists of 1 bit. In this SNP bit 214 is accommodated even parity for the fixed bit 211, the SN bits 212, and the SNP bits 213.

The value of the specifier byte 210, in hexadecimal notation, can be made "00," "17, " "2D," "3A," "4E, " "59," "63," and "74," for example, as in the SAR-PDU header in the conventional AAL type 1 scheme. When, for example, the value of the fixed bit is made "0," the value of the SN bits 212 is made "101," the value of the SNP bits 213 is made "100," and the value of the SNP bit 214 is made "1," the code indicated by the specifier byte 210 will be "59." When this code is "59," the value of the SNP bit 214 becomes "1."

The discretionary data 220 in the data block 200 are user data received by the generator 130 from the outside.

In the case where N=8, for example, there are seven 48-byte data blocks 200, and one 40-byte data block 200, wherefore the data volume of the packet signal 140 is 376 bytes.

This packet signal 140 is temporarily stored in memory in the generator 130, then sent to the transmitter 110. The AAL of the transmitter 110 creates an ATM cell as described below.

FIG. 3(A) diagrams the format of the packet signal 140 received by the transmitter 110. Thus FIG. 3(A) is equivalent to FIG. 2(A).

The transmitter 110, as diagrammed in FIG. 3(B), adds an 8-byte control signal 310 to the end of the packet signal 140, thereby creating a data string 300. When the packet signal 140 consists of 376 bytes, the data string 300 will consist of 384 bytes.

As diagrammed in FIG. 3(B), the control signal 310 contains a 1-bit CPCS-UU (common part convergence sublayer-user-to-user indication) 311, a 1-bit CPI (common part indicator) 312, a 3-bit length 313, and a 3-bit CRC 314. As in the case described above, the length 313 represents the length of the packet signal 140, and the CRC 314 represents a cyclic code.

Next, the AAL of the transmitter 110 executes line coding on the data string 300 in accordance with the type 5 protocol, thereby generating an ATM cell 150. As is well known, each ATM cell signal 150 contains a 5-byte header 151 and a 48-byte payload 152. In the AAL type 5, the entirety of the 48 bytes of payload is allocated to the user. That being so, with the line coding in this embodiment, the payload 152 is generated by dividing the data string 300 into 48-byte data groups. The AAL of the transmitter 110 generates the headers 151, and links payloads 152 to each header 151. Thus the ATM cell 150 is created, as diagrammed in FIG. 3(C).

As described in the foregoing, each payload 152 comprises 48 bytes. This data volume coincides with the data volume in the first N−1 data blocks 200. Accordingly, as diagrammed in FIG. 3(C), in each of the first N−1 ATM cells 150, one data block 200 will be accommodated to one payload 152 as is. In the N'th ATM cell 150, moreover, the N'th data block 200 is accommodated in the first 40 bytes of the payload 152, and the control signal 310 is accommodated in the remaining 8 bytes. Accordingly, in all of the ATM cells 150, the specifier byte 210 is accommodated in the first byte of the payload 152.

The ATM cells 140, created in this manner, are sent from the transmitter 110 to the receiver 120 via the communications path 160. The AAL of the receiver 120 performs ATM testing as described below.

As described in the foregoing, in each ATM cell 150, the specifier byte 210 is accommodated in the first byte in the payload 152. In addition, these specifier bytes 210 have the same configuration and function as the AAL type 1 SAR-PDU headers. Accordingly, the receiver 120 can handle the ATM cells 150 as cells which comply with the AAL type 1 protocol.

The receiver 120 detects the number of cell rejections using the SN bits in the specifier byte 210. Specifically, if the SN bits 212 are discontinous, it is thereby known that a cell corresponding to the missing number was rejected.

The receiver 120 extracts the control signal 310 from the N'th ATM cell 150, and detects the number of bit errors in accordance with the usual AAL type 5 protocol.

Accordingly, as based on the system in this embodiment, the number of cell rejections can be detected from end to end, and the number of cell rejections can be detected accurately even when an ATM cell 150 containing a control signal 310 has been lost on the communications path.

This system can be created at low cost because conventional apparatuses can be used for the transmitter 110 and the receiver 120.

With the system to which this embodiment pertains, a modulo 8 sequence number is accommodated in the SN bits 212, wherefore, when eight or more cells have been continuously rejected, the number of rejections cannot be detected accurately. However, it is extremely rare for eight cells to actually be continuously rejected, so this does not present a problem in practice.

With the system to which this embodiment pertains, the control signal 310 is used exclusively for detecting the number of bit errors, but it is also possible to use the control signal 310 for detecting the number of cell rejections. By using both the specifier bytes 210 and the control signal 310 for detecting the number of cell rejections, it is possible to enhance the reliability of the ATM testing.

Second Embodiment

A second embodiment of the present invention is described next with reference to FIG. 4. In FIG. 4, the configurational elements designated by the same symbol as in FIG. 1 are the same elements, respectively, as in FIG. 1.

The system in this embodiment differs from the system in the first embodiment described above in that this system comprises a receiver 400.

In this system, the receiver 120 detects the number of cell rejections using the specifier byte 210 as in the first embodiment. That is, the receiver 120 performs ATM testing according to the AAL type 1 protocol.

The receiver 400, meanwhile, detects the number of bit errors and the number of cell rejections using the control signal 310 as in a conventional system.

With this system, the number of cell rejections is detected using both the specifier byte 210 and the control signal 310, wherefore the reliability of ATM testing can be enhanced.

In the embodiments described in the foregoing, packet signals made up exclusively of user data, that is, packet signals that do not contain specifier bytes are sent to the generator 130 from the outside, but the generator 130 may generate packet signals 140 directly from user data stored in internal memory.

In addition, in the embodiments described in the foregoing, the description assumes the case where N=8, but N may be any positive integer.

In the embodiments described in the foregoing, the AAL type 5 protocol is adopted for the transmitter 110, while the AAL type 1 protocol is adopted for the specifier byte 210 configuration and the receiver 120. The benefits of the present invention may be realized by accommodating sequence number bits in all ATM cells and accommodating length information in the N'th ATM cell, wherefore the adoption of these protocols is not a mandatory condition. Nevertheless, in order to implement the present invention simply and at low cost by using conventional apparatuses, it is desirable that these protocols be adopted.

What is claimed is:

1. A method for simultaneously testing a transmitter that generates ATM cells and a communication path that communicates the ATM cells from the transmitter to a receiver, the method comprising:

generating a number of data blocks;

providing each of the data blocks with a specifier byte in its header, each of said specifier bytes including a fixed bit of a fixed logical value, sequence number bits expressing a modulo 8 sequence number, three sequence number protection bits for protecting the sequence number bits with CRC, and an even parity bit corresponding to the fixed bit, the sequence number bits, and the sequence number protection bits;

generating packet signals by linking the data blocks, the packet signals having signal lengths of one of 48* N+1 bytes through 48* N+40 bytes (N=0, 1, 2, . . . );

generating ATM cells from the packet signals using AAL type 5 line coding such that the specifier bytes are arranged in front of a payload of the ATM cells; and detecting the number of cell rejections by inspecting the ATM cells using line decoding of AAL type 1.

2. The ATM testing method according to claim 1, further comprising;

detecting bit error and number of cell rejections by inspecting the ATM cells using line decoding of AAL type 5.

3. The ATM testing method according to claim 1, further comprising;

storing the packet signals in a memory device before the transmitter generates the ATM cells.

4. The ATM testing method according to claim 1, wherein the packet signals are used exclusively for testing the transmitter and communication path.

5. An ATM testing system for simultaneously testing a transmitter that generates ATM cells and a communication path that communicates the ATM cells from the transmitter to a receiver, the method comprising:

a test generator generating a number of data blocks, each of the data blocks having a specifier byte in its header, each of said specifier bytes including a fixed bit of a fixed logical value, sequence number bits expressing a modulo 8 sequence number, three sequence number protection bits for protecting the sequence number bits with CRC, and an even parity bit corresponding to the fixed bit, the sequence number bits, and the sequence number protection bits, and for generating packet signals by linking the data blocks, the packet signals having signal lengths of one of 48* N+1 bytes through 48* N+40 bytes (N=0, 1, 2, . . . );

a transmitter coupled to the test generator and generating ATM cells from the packet signals using AAL type 5 line coding such that the specifier bytes are arranged in front of the payload of the ATM cells; and a receiver coupled to the transmitter and detecting the number of cell rejections by inspecting the ATM cells using line decoding of AAL type 1.

6. The ATM testing system according to claim 5, wherein;

in addition to detecting of number of cell rejection using the line decoding of AAL type 1, bit error and number of cell rejection are detected by inspecting the ATM cells using line decoding of AAL type 5.

7. The ATM testing system according to claim 5, further comprising;

a supplementary receiver which detects bit errors and number of cell rejections by inspecting the ATM cells using the line decoding of AAL type 5.

8. The ATM testing system according to claim 5, further comprising;

a memory device which stores the packet signals before the transmitter generates the ATM cells.

9. The ATM testing method according to claim 5, wherein the packet signals are used exclusively for testing the transmitter and communication path.

* * * * *